May 27, 1941.   H. VON WEINGRABER ET AL   2,243,235
HARDNESS INDICATING DEVICE
Filed March 22, 1939    5 Sheets-Sheet 1

Inventors:
Herbert von Weingraber
Walter Knedel
Marshall & Marshall
Attorneys May 27, 1941.    H. VON WEINGRABER ET AL    2,243,235
HARDNESS INDICATING DEVICE
Filed March 22, 1939    5 Sheets-Sheet 2

Fig. 4.

Inventors:
Herbert von Weingraber
Walter Knedel
by Marshall & Marshall
Attorneys

Inventors:
Herbert von Weingraber
Walter Knedel
by Marshall & Marshall
Attorneys Patented May 27, 1941

2,243,235

UNITED STATES PATENT OFFICE 2,243,235

HARDNESS INDICATING DEVICE

Herbert von Weingraber, Berlin-Siemensstadt, and Walter Knedel, Falkenhain, near Finkenkrug, Germany Application March 22, 1939, Serial No. 263,434
In Germany March 29, 1938

15 Claims. (Cl. 265—12)

This invention relates to means in conjunction with hardness testing apparatus projecting instruments and measuring microscopes, for directly indicating surface hardness and strength values, and is based on the following theoretical considerations.

In the Brinell and Vickers hardness tests, the coefficient of hardness is determined by the ratio of load: superficial area of the impression. To ascertain the superficial area of the impression it is sufficient to measure its vertical projection, that is to say in the case of the Brinell test to measure the diameter of the impression and in the case of the Vickers test to measure the length of the diagonals of the quadrilateral impression.

Figure 1:
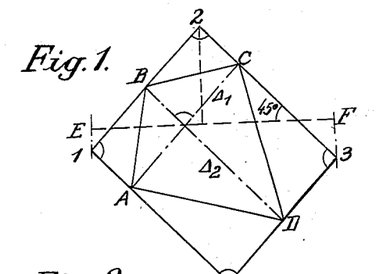
Fig. 1 of the drawings is a plan view on an enlarged scale of a Vickers hardness test impression.

In Fig. 1 of the accompanying drawings the quadrilateral ABCD represents the projection of a greatly exaggerated Vickers hardness test impression. The Vickers coefficient of hardness $H_p$ is then calculated from the length of the two diagonals which are always at right angles to each other when faultless impressing bodies are used, the calculation being as follows:

$$H_p = 1.8544 \frac{P}{\left(\frac{\Delta_1 + \Delta_2}{2}\right)^2} = 1.8544 \frac{P}{\Delta^2}$$

wherein $$\Delta = \frac{\Delta_1 + \Delta_2}{2}$$

Provided the angle of inclination of the diagonals relatively to the horizontal is 45°, the distance between the corners 1 and 3 of the rectangle 1234 circumscribed about the figure of the impression with its sides parallel to the diagonals of the latter, when measured in projection on the horizontal, and denoted by EF in the drawings, is of a length which is given by $$EF = \frac{\Delta_1}{\sqrt{2}} + \frac{\Delta_2}{\sqrt{2}} = \frac{1}{\sqrt{2}}(\Delta_1 + \Delta_2) = \sqrt{2}\frac{\Delta_1 + \Delta_2}{2} = \sqrt{2}\Delta$$

that is to say the distance EF is proportional to the mean of the two diagonals $\Delta_1$ and $\Delta_2$.

Assuming therefore that the impression or its image be bounded on all sides by two pairs of members forming the angles 214 and 234 and displaced parallel to the diagonals (in the case of Brinell impressions parallel to two diameters at right angles to each other) it will be understood that the distance EF, which is readily measurable and capable of being indicated for instance by means of suitable transmission mechanism coupled to a pointer furnishes a measure of the Vickers or Brinell hardness for a particular load.

Figure 2:
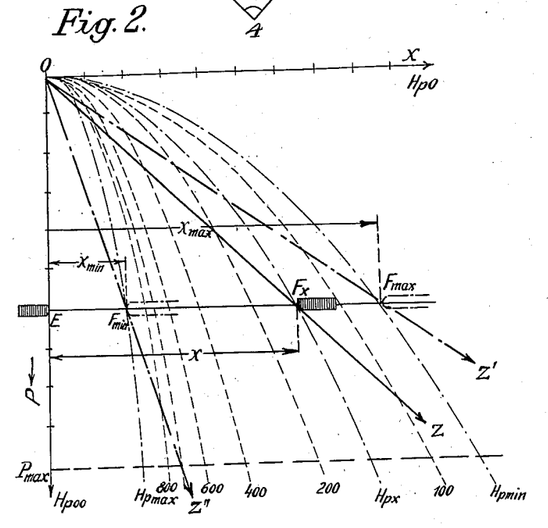
Fig. 2 is a diagrammatic showing of an apparatus embodying the invention for determining the hardness of a test piece from a measurement of the impression shown in Fig. 1.

As may be seen from Fig. 2 of the accompanying drawings a certain coefficient of hardness $H_{px}$ corresponds to different distances $EF_x = x$ when different testing loads are used, for the reason that $$x = \sqrt{2}\Delta = \sqrt{2}\sqrt{\frac{1.8544P}{H_{px}}}$$

If $H_p$ were infinite $x$ would be zero, while if $H_p$ were zero $x$ would be infinite. In reality the hardness values to be indicated will lie between $H_{p\,min}$ ($x = x$ max) and $H_{p\,max}$ ($x = x$ min).

Figure 3:
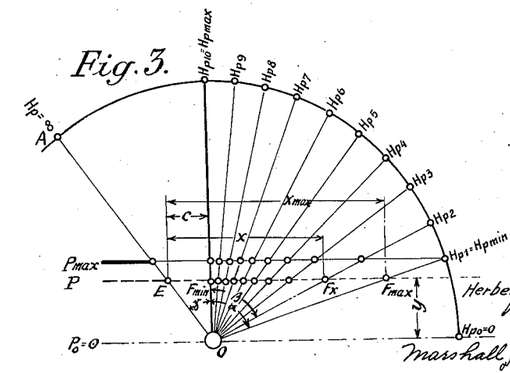
Fig. 3 is a diagrammatic showing of a preferred form of the apparatus.

Let the points E and F be formed corporeally by the ends of two rods connected to the left- and right-hand measuring angles respectively. If it be then assumed that a pointer 0Z rotatable about the point 0 be positively rotated while the terminal point F of the right hand rod is displaced horizontally it will readily be understood that, as the hardness values increase by equal intervals the distances $EF_x$ decrease at a progressively reduced rate, or in other words that the rotation of the pointer will slow down as the hardness increases. The divisions of a scale calibrated in degrees of hardness would therefore become markedly crowded towards the end of the scale representing the higher degrees of hardness, which would be a serious hindrance to accuracy of reading. This drawback may be combatted for instance by placing the pivot point 0, as shown in Fig. 3 of the accompanying drawings, in such a position that at $H_{p\,max}$ the pointer is at right angles to EF. Slight variations of $x$ at high degrees of hardness would then correspond to relatively large intervals on the arcuate scale, while conversely at low degrees of hardness large variations of $x$ would correspond to only small intervals on the scale. In this manner great accuracy of reading can be obtained at high degrees of hardness.

The distance $c$ between the end point E of the left-hand rod (the theoretical position of the pointer when $H_p$ is infinite) and the vertical passing through 0 represents the idle path through which E and F can be moved away from each other without indicating an actually possible hardness value. From Fig. 3 it will also be seen that by shifting the point of application of E relatively to the pivot point O of the pointer, that is to say by an alteration of the lever arm, it becomes possible to use one and the same scale for all testing loads from $P=0$ to $P_{max}$ since for certain coefficients of hardness $H_p$ when the testing load P varies, the corresponding distances $x$ are proportionate to each other. If the angle of deflection of the pointer be taken as $\alpha$ it follows that $$\tan \alpha = \frac{x_{max} - c}{y}$$

Moreover, $$x_{max} = \sqrt{2}\sqrt{\frac{1.8544 P}{H_{p\,min}}} = C\sqrt{\frac{P}{H_{p\,min}}}$$

The angle of deflection $\beta$ for a particular hardness $H_{px}$ is calculated as follows when the testing load is P $$\tan \beta = \frac{x-c}{y} = \frac{x-c}{x_{max}-c} \times$$

$$\tan \alpha = C_1\left(\sqrt{\frac{1}{H_{px}}} - \sqrt{\frac{1}{H_{p\,max}}}\right)$$

The angle of idle movement $\gamma$ is calculated as follows:

$$\tan \gamma = \frac{c}{y} = \frac{C\cdot\sqrt{\frac{P}{H_{p\,max}}}}{x_{max} - C\cdot\sqrt{\frac{P}{H_{p\,max}}}} \times \tan \alpha =$$

$$\frac{\sqrt{H_{p\,min}}}{\sqrt{H_{p\,max}} - \sqrt{H_{p\,min}}} \tan \alpha = k$$

The angle of idle movement $\gamma$ is thus dependent on the testing load used and on the hardness of the test piece, and is constant.

A main object of the invention is to provide means, in conjunction with hardness testing apparatus or projectors or measuring microscopes associated with such apparatus, for directly indicating surface hardness or strength values, wherein the test result can be read off immediately after the test, without the necessity for making calculations or using conversion tables to evaluate the result.

It is a further object of the invention to provide indicating means of the type specified, having a scale the graduations of which are of such pitch as to admit of accurate reading throughout the entire range of measurement, and in which one and the same scale is used for all testing loads.

A further object of the invention is to enable separate indications to be obtained, of the hardness or strength values corresponding to individual dimensions of the test impression.

A still further object of the invention is to provide an indicating hardness tester of which the parts are so arranged that specimens of large size and awkward shape may be tested without impeding the view of the scale on which the result of the test may be directly read off.

With these and other objects in view the invention consists broadly in obtaining an enlarged or magnified image of a hardness test impression, and measuring crucial dimensions of said image with the aid of gauging means operatively coupled to an indicator calibrated in units of hardness.

The indicating means according to the invention based on the above theoretical considerations may be embodied in three different forms of device for directly indicating hardness values, namely:

1. In the form of a ground glass screen arrangement built into a hardness testing apparatus, or of an attachment to be added to an existing hardness tester. In the latter case it is also capable of being used in conjunction with independent projecting appliances.

2. In the form of an indicating or measuring microscope built into a hardness tester.

3. In the form of a separate microscope capable of being used independently of a hardness tester.

All three forms of the device are built on the same principle which will now be described in detail with reference to Figs. 4 to 9 of the accompanying drawings, in which.

Figure 4:
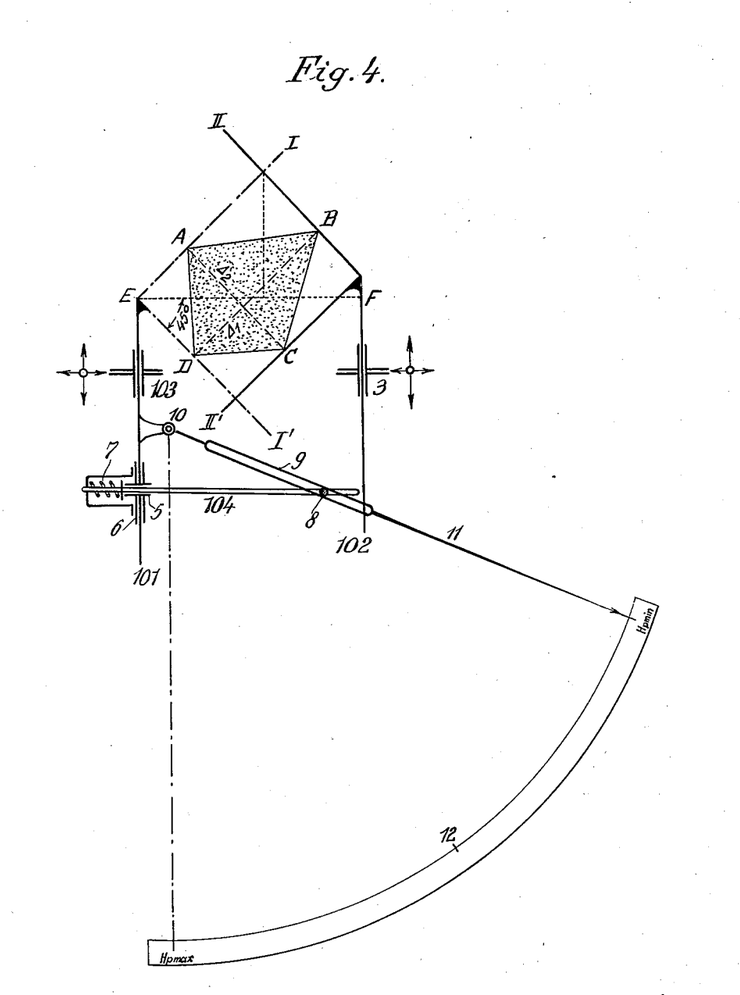
Fig. 4 is a diagrammatic representation of the essential parts of the indicating device according to the invention.

Referring to Fig. 4, the quadrilateral figure ABCD represents the image of a hardness test impression produced in known manner on the ground glass plate of a hardness tester or observed with the aid of an independent or built-in microscope, in the present instance the image of a Vickers test impression. With the aid of two gauging members 101 and 102 having pairs of rectangular measuring arms I—I', II—II', the diagonals $\Delta_1$ and $\Delta_2$ of the impression are gauged with the arms of the gauging members disposed parallel to the diagonals of the image. The measuring arms I—I' and II—II' are rigidly connected to the respective gauging members 101 and 102. By means of suitable devices 103 (e. g. cross-slides, pairs of leaf springs or the like) these gauging members are adjustable relatively to each other together with the measuring arms attached thereto. The distance EF is measured off between the members 101 and 102 by means of a measuring rod 104. This rod is movably supported in a bushing 5 which in its turn is movable on the member 101 by means of a sleeve 6, and is pressed by a spring 7 against the member 102. A driver pin 8 mounted on the rod 104 travels in a slotted guide rail 9 forming part of the pointer 11 pivoted at 10. This pointer 11 plays between limits representing the maximum and minimum lengths of EF, over a scale 12 which is rigidly attached to the member 101. These limits are those for $H_{p\,min}$ and $H_{p\,max}$, and the vertical position of the pointer is that for the maximum degree of hardness of $H_{p\,max}$. By displacement of the bushing 5 on the member 101 the transmission ratio of the pointer lever may be varied, for different testing loads P, so that the same scale may be used for all loads.

If it is required that the scale 12 and the pivot 10 of the pointer 11 do not participate in the movement of the member 101, but remain fixed in space, various arrangements of a mechanical nature are conceivable which allow of the fulfilment of this condition.

After the hardness test impression in the specimen or piece of material to be tested has been produced by means of a Brinell ball or a Vickers diamond, a sharply defined and enlarged image of this impression is cast on the ground glass screen of the hardness tester or of the projection apparatus associated therewith, or a magnified image thereof is obtained and viewed through a separate or a built-in microscope. With the aid of suitable adjusting means 103 the two gauging members 101 and 102 with their pairs of rectangular measuring marks or arms I—I' and II—II' are then moved up to the enlarged image ABCD of the impression (Fig. 4) so as to gauge this image either across two diameters disposed at right angles to each other in the case of the Brinell test, or, across the two diagonals in the case of the Vickers test. Then (or if desired before then) the sleeve 6 on the arm 101 is adjusted to the distance from the pivot point 10 which corresponds to the testing load used, for instance with the aid of a scale calibrated in units of load. The distance EF representing the mean value of the two diameters or diagonals and corresponding to the distance between the members 101 and 102 is thereby automatically transmitted, by means of the rod 104 and the driver pin 8, to the pointer 11 with the aid of which the correct hardness value may then be read off on the scale 12 calibrated in units of hardness.

An optical indicator is operated in a similar manner.

Figure 5:
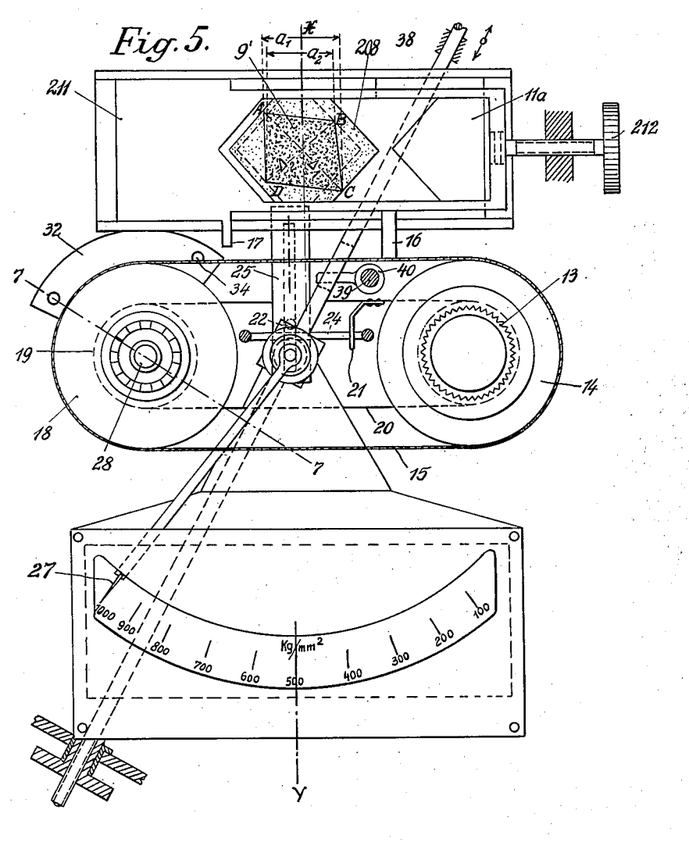
Figs. 5 and 6 show a modified form of the indicating device in front elevation and vertical axial section, respectively.
Figure 6:
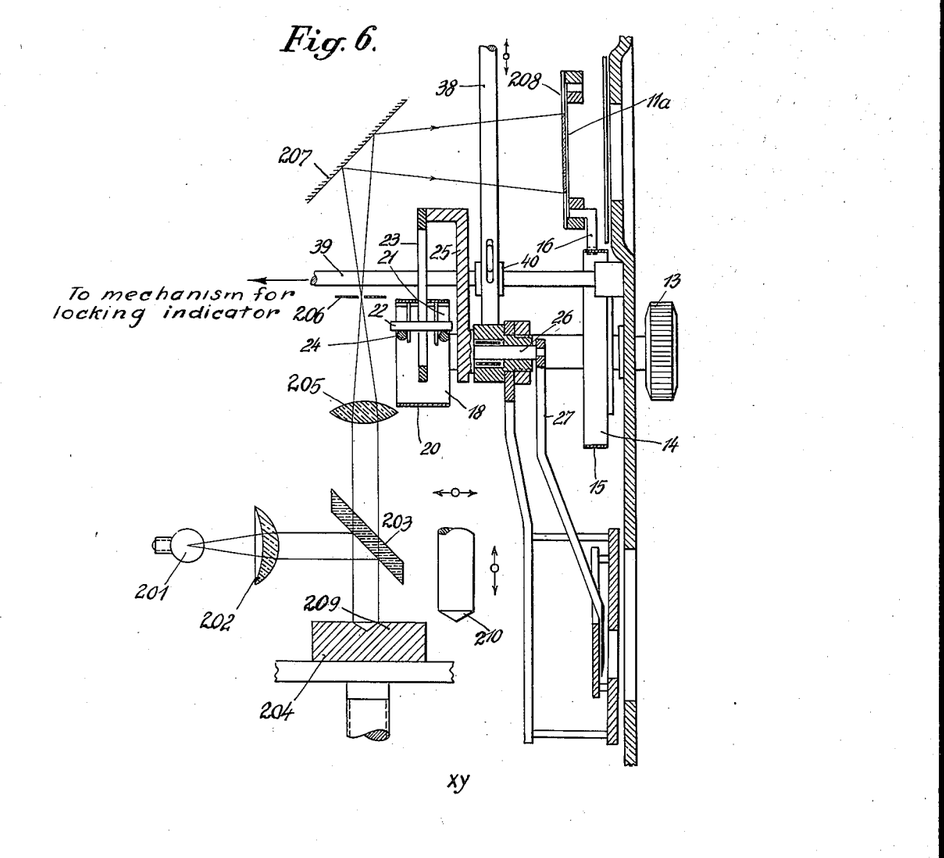

In certain cases it is desirable to obtain a direct indication not only of the hardness of a testpiece, of which the mean value of two diameters or of the two diagonals serves as a measure, but also of the hardness figures corresponding to each of the diameters or diagonals. This may be done for instance with the aid of an arrangement of the following kind, as illustrated in Figs. 5 and 6.

Figure 7:
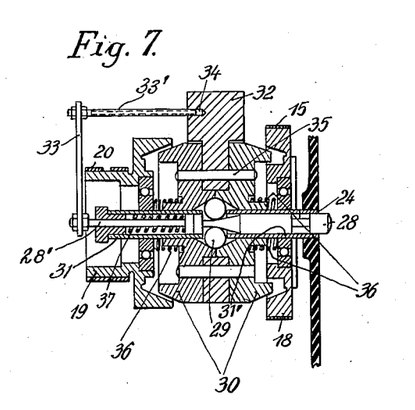
Fig. 7 shows a detail of the operating mechanism in section on the line 7—7 of Fig. 5.

An image of the impression 209 made in the test specimen 204 by the pivotally removable impressed testing body 210 is cast by means of an optical system 201, 202, 203, 205, 206 and 207 onto a ground glass plate 208 where it appears in the form of a shadow image 9' enlarged according to the composition of the optical system employed. The mark or measuring arms on the adjustable gauging member 211 is brought into sighting alignment with the corner A of this shadow image by means of adjusting mechanism 212. The corner C diagonally opposite A is then sighted against the mark or arm on the gauging member 11a by rotation of the knob 13, which has the effect of moving the gauging member 11a through the intermediary of a pulley 14, a steel band 15 and a driver 16. The gap $a_1$ between the two marks represents the projection of the diagonal $\Delta_1 = AC$. By pressure exerted on a press-button 28 on the outer end of a tapered spindle (Fig. 7), the peripheral surfaces of two clutch cones 30 are uniformly pressed, through the intermediary of balls 29, against conical friction surfaces on pulleys 18 and 19 loosely mounted on hollow shafts 31 and 31' respectively. At the same time, through the intermediate of an arm 33 attached to the spindle 28' and carrying an arresting pin 33' engaging in a socket 34, a segment-shaped weight 32 is released for rotary downward movement. Since this weight is connected by pins 35 to the clutch cones 30 these cones and the pulleys 18 and 19 are thereby also rotated, this rotation continuing until the driver 16 of the gauge 11a strikes against an abutment 17 on the gauge 211, the distance traversed being equal to $a_1$. Pressure is maintained on the button 28 until the pointer 27 comes to rest. When the press-button 28 is released the pulleys 18 and 19 are disengaged by the action of springs 36. Owing to gravity the segment-shaped weight 32 travels through half its path of movement and is then arrested by the pin 33' engaging, under the action of a spring 37, in a second socket 34 (Figs. 5 and 7).

If then the gauging members 211 and 11a (Fig. 5) be moved up so that they gauge the diagonal across the corners B and D, $a_2$ is obtained as the projection of BD. If pressure be again exerted on the button 28 the segment-shaped weight 32 drops into its lowermost position or until the driver 16 again comes in contact with the stop 17.

The total distance $a_1 + a_2$ travelled by the steel band 15 will thus have been transmitted, through the clutch, to the steel band 20, reduced in the ratio between the radii of the pulleys 18 and 19. The transmission of the movement of the steel band 20 to the pointer 27 of the indicator is effected as follows, with the aid of a driving element 21 firmly attached to the steel band:

A sliding pin 22 is radially movable in a slotted guide 23 (Fig. 6) in which it fits without play. In the starting position the guide 23 occupies a vertical position. At every rotation of the guide 23 the sliding pin 22 bears against the ledge 24. At every movement of the steel band 20 the driving element 21, after a certain idle movement, strikes against the sliding pin 22 and, through the intermediary of this latter, rotates the guide 23 together with the crank 25 about the pin 26. The pointer 27 participates in this rotary movement. By displacement of the pivot about which the pointer rotates, along the setting rod 38, it becomes possible to use the same scale for all testing loads without altering the position of the end points of the scale. Since with this arrangement the vertical starting position of the guide 23 corresponds to maximum hardness the pointer will travel through large angles at high degrees of hardness in spite of the fact that the steel band 20 moves through short distances. In this manner the desired pitch of the divisions of the scale conducive to more accurate reading is obtained.

If it is desired to ascertain the individual hardness values corresponding respectively to the two diameters or diagonals, either the intermediate setting of the pointer is read off on another scale or the position of the pointer pivot relatively to the steel band 20 is altered by means of the setting rod 38. The gauging of the first diagonal or of the first of the diameters, and the ascertainment of the hardness value corresponding thereto, is then effected in the above described manner before the second adjustment is made and the second reading taken. The weight 32 is first put back into the zero position with the aid of a lever (not shown) while pressure is kept exerted on the button 28, which has the effect of also returning the pointer 27 into its starting position. The hardness corresponding to the second diagonal or to the second diameter may then be ascertained in the same manner as before.

The corner A of the image of the test impression ABCD, which appears enlarged on the ground glass screen of the instrument, or which is viewed in the microscope, is sighted against the mark or arm of the gauging member 211 with the aid of the knob 212, and the corner C against the mark or arm of the gauging member 11a moved with the aid of the knob 13. By exerting pressure on the button 28 the clutch is disengaged and the gauging member 11a moves towards the left until the driver 16 strikes against the stop 17. By this operation of the press-button 28 the indicator is also set in operation and the pointer 27 indicates a degree of hardness corresponding to the length of the gauged diagonal. As soon as the pointer has come to rest the press-button 28 is released and the corners D and B sighted against the marks or arms of the gauging members 21l and 11a respectively. The indicator is then again operated with the aid of the press-button 28. After the pointer has come to rest there may be read off on the scale either the hardness corresponding to the mean value of the two distances to which the apparatus has been adjusted or the individual hardness corresponding to the second of these distances, according to which scale is used or to how the rod 38 was set.

Figure 8:
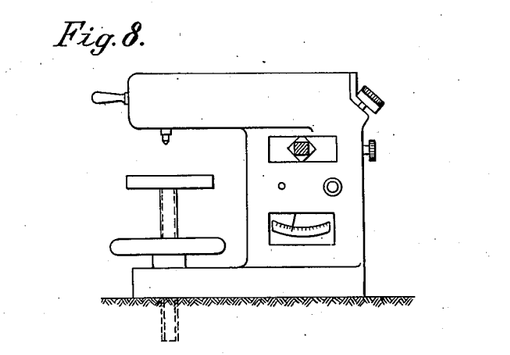
Figs. 8 and 9 show diagrammatically the layout of a hardness tester equipped with the indicating device according to the invention, in elevation and in plan view, respectively.
Figure 9:
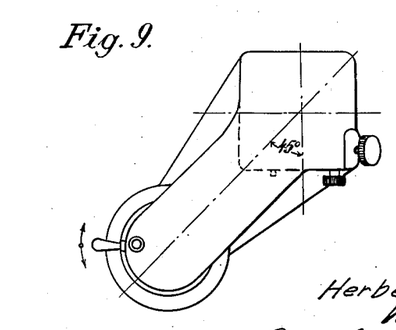

The described indicating device may be assembled with a known type of hardness testing apparatus to form a compact unit, as shown in Figs. 8 and 9 of the drawings.

These figures show a vertical movable platform for supporting the test-piece and adapted to be moved under a controllable load, against a testing die or impressing member (Brinell ball or Vickers diamond) mounted in an arm or bracket disposed at an angle of 45° to a pedestal portion in which the gauging members and the indicator are housed. This arrangement has the advantage of enabling test pieces or specimens of awkward shape to be tested without interfering with legibility of the readings or with the accessibility of the operating elements, and enables the projecting screen and gauging members to be provided at a convenient height, for instance behind a window in a side wall of the pedestal.

A further feature of the invention consists in the provision of means for locking the indicator against movement in the event of improper adjustment of the means for setting the device to different testing loads. Referring to Figs. 5 and 6 of the drawings this purpose may be served for example by the provision of a latch member 40 which engages in a slot in the setting rod 38 and is fast on a shaft 39. Locking mechanism (not shown), adapted to arrest the indicating mechanism, may be operatively associated with the rod 39 in such a manner as to take effect as soon as the rotation of the rod 39 in either direction exceeds a certain predetermined limit.

Impressed testing bodies are also called "indenters," and impressing bodies are known by the name of "diamond indenters."

We claim:

1. A device for indicating the hardness of a test-piece by measuring an impression made therein by a known load, comprising in combination means for producing an enlarged image of a hardness test impression formed in the test-piece, a plurality of mutually adjustable members for gauging two dimensions of the said image of which the mean is a measure of the hardness of the test-piece, a scale graduated in degrees of hardness, an index pointer coacting with the said scale and transmission gearing interposed between said gauging member and the said pointer for displacing said pointer in accordance with the mean of the two dimensions gauged by said gauging members.

2. A device for indicating the hardness of a test-piece by measuring an impression made therein by a known load, comprising in combination means for producing an enlarged image of a hardness test impression formed in the said test-piece, adjustable means for gauging two dimensions of the said image of which the mean is a measure of the total superficial area of the said impression, a scale graduated in degrees of hardness, a pivoted index pointer coacting with the said scale, transmission gearing interposed between the said gauging means and the said pointer, and means for displacing the pivot about which said pointer rotates, for the purpose of enabling the said scale to be used for more than one testing load.

3. A device for indicating the hardness of a test-piece by measuring an impression made therein by a known load, comprising in combination means for producing an enlarged image of a hardness test impression formed in the test-piece, adjustable means for gauging two dimensions of the said image of which the mean is a measure of the total superficial area of the said impression, a scale graduated in degrees of hardness, an index pointer coacting with the said scale, transmission gearing interposed between said gauging means and the said pointer, and means for altering the transmission ratio of said gearing to enable the said scale to be used for different testing loads.

4. A device for indicating the hardness of a test-piece by measuring an impression made therein by a known load, comprising in combination means for producing an enlarged image of a hardness test impression formed in the said test-piece, two mutually adjustable gauging members movably supported on opposite sides of the field of vision occupied by the said image, means for controllably moving the said members to bring defining elements thereof into sighted alignment with selected points on the said image, and indicating means comprising a scale graduated in degrees of hardness and an index pointer coacting with the said scale and operatively coupled, through the intermediary of transmission gearing, with the said gauging members.

5. A device for indicating the hardness of a test-piece by measuring an impression made therein by a known load, comprising in combination means for producing an enlarged image of a hardness test impression formed in the said test-piece, two mutually adjustable gauging members movably supported on opposite sides of the field of vision occupied by the said image, means for controllably moving the said members to bring defining elements thereof into sighted alignment with selected points on the said image, and indicating means comprising a scale graduated in degrees of hardness and an index pointer coacting with the said scale and operatively coupled, through the intermediary of transmission gearing, with the said gauging members, the said transmission gearing being adapted to transmit the sum of a plurality of dimensions of the said image measured between the said gauging members.

6. A device for indicating the hardness of a test-piece by measuring an impression made therein by a known load, comprising in combination means for producing an enlarged image of a hardness test impression formed in the said test-piece, two mutually adjustable gauging members movably supported on opposite sides of the field of vision occupied by the said image, means for controllably moving the said members to bring defining elements thereof into sighted alignment with selected points on the said image, and indicating means comprising a scale graduated in degrees of hardness and an index pointer coacting with the said scale and operatively coupled, through the intermediary of transmission gearing, with the said gauging members, each of said gauging members having two defining elements disposed at right angles to each other and inclined at 45° to the direction of movement of the said gauging members, and the said image-producing means being adapted to produce said image in such a position that the dimensions to be measured are at right angles to the said defining elements.

7. A device for indicating the hardness of a test-piece by measuring an impression made therein by a known load, comprising in combination means for producing an enlarged image of a hardness test impression formed in said test-piece, two mutually adjustable gauging members having defining elements and movably supported on opposite sides of the field of vision occupied by the said image, adjusting means for controllably moving the said members to bring the said defining elements into sighted alignment with determinative points on the said image, a fixed scale graduated in degrees of hardness, a pivoted structure comprising an index pointer coacting with said scale, a driving element movable in a straight path and adapted to engage said pointer structure and to move said pointer relatively to said scale, the path of movement of said driving element being substantially at right angles to the engaged portion of said structure when its pointer is in a terminal position relatively to said scale, and transmission gearing between said adjusting means and said driving element.

8. A device for indicating the hardness of a test-piece by measuring an impression made therein by a known load, comprising in combination means for producing an enlarged image of a hardness test impression formed in said test-piece, two mutually adjustable gauging members having defining elements and movably supported on opposite sides of the field of vision occupied by the said image, adjusting means for controllably moving the said members to bring the said defining elements into sighted alignment with determinative points on the said image, a fixed scale graduated in degrees of hardness, a pivoted structure comprising an index pointer coacting with said scale, a driving element normally spaced from said pointer structure and movable in a straight path for operative engagement with the said structure, the path of movement of said driving element being substantially at right angles to the portion of said pointer structure engaged by said driving element when said pointer is in an end position relatively to said scale, transmission gearing between said adjusting means and said driving element, and means for varying the distance between the pivot of said pointer structure and the point of engagement between said driving element and said structure, for the purpose of compensating for different testing loads while retaining one and the same graduated scale, the said latter means being adapted also to vary positively the initial clearance between said driving element and said pointer structure so that the idle portion of the operative movement of said driving element is reduced when the distance between the said pivot and the point of attachment of said element is decreased, and vice versa.

9. Apparatus for indicating the hardness of a test-piece by measuring an impression made therein by a known load, comprising in combination a projection screen, optical projecting means adapted to be focussed on said impression and to cast an enlarged image thereof on said screen, a guide support mounted in front of said screen, two gauging members having defining elements and movably mounted in said guide support, means for independently moving said gauge members to bring said defining elements into sighted alignment with points on the said image for measuring a projection of a dimension thereof, a scale calibrated in degrees of hardness, an index pointer coacting with said scale, and means for transmitting to the said pointer a movement commensurate to the length of the said projection.

10. Apparatus for indicating the hardness of a test-piece by measuring an impression made therein by a known load, comprising in combination a projection screen, optical projecting means adapted to be focussed on said impression and to cast an enlarged image thereof on the said screen, a guide support mounted in front of said screen, two gauging members having defining elements and movably mounted in said guide support, means for independently moving said gauge members to bring said defining elements into sighted alignment with points on the said image for consecutively measuring the projections, in one plane, of two crucial dimensions thereof, a scale calibrated in degrees of hardness, an index pointer coacting with said scale, and means for transmitting to the said pointer a movement commensurate to the sum of the lengths of the said projections.

11. Apparatus for indicating the hardness of a test-piece by measuring an impression made therein by a known load, comprising in combination a projection screen, optical projecting means adapted to be focussed on said impression and to cast an enlarged image thereof on the said screen, a guide support mounted in front of said screen, two gauging members having defining elements and movably mounted in said guide support, means for independently moving said gauge members to bring said defining elements into sighted alignment with points on the said image, an abutment on one of said gauging members, means for manually adjusting said gauging member, two aligned pairs of concentric pulleys of different diameters mounted in spaced relation to each other beneath the said screen and gauging members, an endless travelling belt laid around both the aligned pulleys of the said pairs of pulleys, a driving element attached to the belt travelling over the larger of said pulleys in alignment with the said abutment, and adapted to engage the other of said gauging members, a pointer-driving element secured to the belt travelling over the smaller of said pulleys, an axially adjustable rod traversing the device and inclined at an angle to the path of movement of said pointer-driving element, a fixed supporting frame, a scale graduated in degrees of hardness beneath said pairs of pulleys, a pivotally mounted pointer structure comprising an index pointer adapted to play over said scale, a crank attached to the pivot-pin of said pointer, a slotted guide attached to said crank, and an engaging pin resting upon said supporting frame and adapted to travel in said slotted guide in the path of movement of said pointer-driving element, means for axially moving said rod, means for manually rotating the larger pulley of one of the said pairs of concentric pulleys to adjust the other of said gauging members through the intermediary of said driving element, interconnected clutch cones normally spaced from coacting conical surfaces in the pulleys of the other of said concentric pairs of pulleys, manually operable means for bringing said cones into frictional engagement with said conical surfaces so as to couple together the pulleys of said pair for rotational movement, and a peripheral biassing weight coupled to said cones and releasable by said manually operable engaging means to drive said pulleys, belts, driving elements and pointer structure until arrested by the said first-named driving element coming in contact with said abutment.

12. Apparatus as claimed in claim 11, further comprising means for arresting said weight while the said gauging members are re-adjusted for a second measurement and thereafter releasing said weight to drive said pulleys, driving elements and pointer structure in accordance with said second measurement.

13. Apparatus as claimed in claim 11, further comprising means for locking said pointer structure against movement after axial movement of said rod beyond a predetermined limit in either direction.

14. A device for indicating the hardness of a test-piece by measuring an impression made therein by a known load, comprising in combination means for producing an enlarged image of a hardness test impression formed in the test-piece, two relatively displaceable members adapted to gauge said image by their relative displacement, an indicator calibrated in degrees of hardness, and a variable transmission device for displacing said indicator in accordance with the relative displacement of said members, said transmission device being variable in accordance with the load to produce a constant reading of said indicator for impressions of various sizes made in a material of given hardness by various loads.

15. A device for indicating the hardness of a test-piece by measuring an impression made therein by a known load, comprising in combination means for producing an enlarged image of a hardness test impression formed in the test-piece, a plurality of relatively adjustable members for gauging two dimensions of the said image of which the mean is a measure of the hardness of the test-piece, said members being adapted to gauge the said image from all sides, a scale graduated in degrees of hardness, an index pointer coacting with the said scale and transmission gearing interposed between said gauging members and said pointer.

HERBERT v. WEINGRABER.
WALTER KNEDEL.